(12) United States Patent
Shimizu et al.

(10) Patent No.: US 11,602,731 B2
(45) Date of Patent: Mar. 14, 2023

(54) DEHUMIDIFYING ELEMENT, DEHUMIDIFYING DEVICE INCLUDING DEHUMIDIFYING ELEMENT, AND METHOD OF MANUFACTURING DEHUMIDIFYING ELEMENT

(71) Applicant: Mitsubishi Electric Corporation, Tokyo (JP)

(72) Inventors: Akinori Shimizu, Tokyo (JP); Shota Yamada, Tokyo (JP); Seiro Yuge, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/776,239

(22) PCT Filed: Jan. 6, 2020

(86) PCT No.: PCT/JP2020/000046
§ 371 (c)(1),
(2) Date: May 12, 2022

(87) PCT Pub. No.: WO2021/140540
PCT Pub. Date: Jul. 15, 2021

(65) Prior Publication Data
US 2022/0387972 A1    Dec. 8, 2022

(51) Int. Cl.
*B01D 53/02*    (2006.01)
*B01J 20/26*    (2006.01)
(Continued)

(52) U.S. Cl.
CPC .......... *B01J 20/267* (2013.01); *B01D 53/261* (2013.01); *B01D 53/28* (2013.01); *B01J 20/2804* (2013.01);
(Continued)

(58) Field of Classification Search
CPC ............ B01D 2253/202; B01D 53/261; B01D 53/28; B01D 2260/023; B01D 2260/028;
(Continued)

(56) References Cited

U.S. PATENT DOCUMENTS 3,800,515 A * 4/1974 Asker ................ F28F 25/08
                                                  55/498
2007/0185292 A1 8/2007 Nishida
(Continued)

FOREIGN PATENT DOCUMENTS

JP    8-281047 A    10/1996
JP    2002-340372 A    11/2002
(Continued)

OTHER PUBLICATIONS

International Search Report and Written Opinion dated Apr. 7, 2020, received for PCT Application PCT/JP2020/000046, Filed on Jan. 6, 2020, 11 pages including English Translation.
(Continued)

*Primary Examiner* — Christopher P Jones
(74) *Attorney, Agent, or Firm* — Xsensus LLP

(57) ABSTRACT

A dehumidifying element includes a plurality of sheets that have moisture adsorption and desorption properties and that are stacked on top of each another. At least some of the sheets each have an irregular shape. The sheets each contain a hygroscopic agent having properties of a re-moistening-type glue that exhibits adherence when adsorbing moisture and that solidifies when being dried. The sheets are bonded to each other by the hygroscopic agent.

9 Claims, 9 Drawing Sheets

(51) Int. Cl.
| | |
|---|---|
| *B01J 20/28* | (2006.01) |
| *B01J 20/30* | (2006.01) |
| *B01D 53/28* | (2006.01) |
| *B01D 53/26* | (2006.01) |
| *B32B 3/28* | (2006.01) |
| *B32B 5/02* | (2006.01) |
| *B32B 5/26* | (2006.01) |
| *B32B 7/12* | (2006.01) |
| *B32B 29/00* | (2006.01) |
| *B32B 29/02* | (2006.01) |
| *B32B 29/06* | (2006.01) |
| *B32B 29/08* | (2006.01) |
| *B32B 37/12* | (2006.01) |
| *B32B 37/18* | (2006.01) |
| *B32B 38/00* | (2006.01) |

(52) U.S. Cl.
CPC ... *B01J 20/28035* (2013.01); *B01J 20/28052* (2013.01); *B01J 20/3042* (2013.01); *B32B 3/28* (2013.01); *B32B 5/022* (2013.01); *B32B 5/266* (2021.05); *B32B 7/12* (2013.01); *B32B 29/005* (2013.01); *B32B 29/02* (2013.01); *B32B 29/06* (2013.01); *B32B 29/08* (2013.01); *B32B 37/12* (2013.01); *B32B 37/182* (2013.01); *B32B 38/0012* (2013.01); *B01D 2253/202* (2013.01); *B32B 2037/1276* (2013.01); *B32B 2038/0056* (2013.01); *B32B 2250/20* (2013.01); *B32B 2250/26* (2013.01); *B32B 2250/42* (2013.01); *B32B 2255/02* (2013.01); *B32B 2255/12* (2013.01); *B32B 2255/26* (2013.01); *B32B 2260/023* (2013.01); *B32B 2260/028* (2013.01); *B32B 2260/046* (2013.01); *B32B 2262/02* (2013.01); *B32B 2262/103* (2013.01); *B32B 2305/07* (2013.01); *B32B 2307/302* (2013.01); *B32B 2307/7166* (2013.01); *B32B 2307/724* (2013.01); *B32B 2333/08* (2013.01)

(58) Field of Classification Search
CPC .......... B01D 2260/046; B01D 2262/02; B01D 2262/103; B01J 20/267; B01J 20/28035; B01J 20/2804; B01J 20/28052; B01J 20/3042; B32B 2250/20; B32B 2250/26; B32B 2250/42; B32B 2255/02; B32B 2255/12; B32B 2255/26; B32B 2305/07; B32B 2307/302; B32B 2307/7166; B32B 2307/724; B32B 29/005; B32B 29/02; B32B 29/06; B32B 29/08; B32B 3/28; B32B 37/12; B32B 37/182; B32B 5/022; B32B 5/266; B32B 7/12
See application file for complete search history.

(56) References Cited

U.S. PATENT DOCUMENTS

| | | |
|---|---|---|
| 2010/0089558 A1 | 4/2010 | Takada et al. |
| 2011/0108256 A1 | 5/2011 | Takada et al. |
| 2012/0301563 A1* | 11/2012 | Aikens .................... C12P 19/12 435/257.1 |
| 2016/0176168 A1* | 6/2016 | Zhao ....................... B32B 27/36 428/423.1 |
| 2017/0360676 A1* | 12/2017 | Dihora ................. A61K 8/0241 |

FOREIGN PATENT DOCUMENTS

| | | |
|---|---|---|
| JP | 2017-13032 A | 1/2017 |
| JP | 6380906 B2 | 8/2018 |
| JP | 2019-118899 A | 7/2019 |
| WO | 2005/090417 A1 | 9/2005 |
| WO | 2008/041327 A1 | 4/2008 |
| WO | 2015/111610 A1 | 7/2015 |

OTHER PUBLICATIONS

Notice of Reasons for Refusal dated Oct. 6, 2020, received for JP Application 2020-538159, 9 pages including English Translation.
Decision to Grant dated Jan. 5, 2021, received for JP Application 2020-538159, 5 pages including English Translation.

* cited by examiner

Comparative Example

DEHUMIDIFYING ELEMENT, DEHUMIDIFYING DEVICE INCLUDING DEHUMIDIFYING ELEMENT, AND METHOD OF MANUFACTURING DEHUMIDIFYING ELEMENT

CROSS-REFERENCE TO RELATED APPLICATION

The present application is based on PCT filing PCT/JP2020/000046, filed Jan. 6, 2020, the entire contents of which are incorporated herein by reference.

TECHNICAL FIELD

The present disclosure relates to a dehumidifying element, a dehumidifying device including the dehumidifying element, and a method of manufacturing the dehumidifying element. More specifically, the present disclosure relates to a dehumidifying element that adsorbs and desorbs moisture in air as in dehumidifying and humidifying elements for use in industrial, home, and automobile air conditioners and a dehumidifying material for refrigerator trucks, cooling chambers, refrigerators, etc.; a dehumidifying device including the dehumidifying element; and a method of manufacturing the dehumidifying element.

BACKGROUND ART

In existing dehumidifying elements, planar sheets having moisture adsorption and desorption properties and corrugated sheets are bonded to each other and stacked on top of each other by an adhesive. Such a dehumidifying element using an adhesive cannot fulfill a moisture adsorption and desorption function at part of the sheets that is coated with the adhesive. In view of this point, in a given technique, in order to increase the moisture adsorption effective area, bonded portions are reduced, thereby improving the performance of a dehumidifying element (for example, see Patent Literature 1).

CITATION LIST

Patent Literature

Patent Literature 1: Japanese Patent No. 6380906

SUMMARY OF INVENTION

Technical Problem

In Patent Literature 1, contact portions between the sheets have portions that are not bonded to each other. Thus, when used in an environment where dry and wet conditions are repeated, the dehumidifying element repeatedly expands and contracts. Consequently, the portions that are not bonded expand, as a result of which gaps may be made in the bonded portions of the sheets. If such gaps in the bonded portions are made at a lot of positions of a multilayer structure, air unevenly flows in areas having gaps and areas having no gap, and as a result a hygroscopic performance becomes unstable.

The present disclosure is made to solve the above problem and relates to a dehumidifying element in which gaps are harder to form in bonded portions of sheets and that has stable hygroscopic performance, a dehumidifying device including the dehumidifying element, and a method of manufacturing the dehumidifying element.

Solution to Problem

A dehumidifying element according to an embodiment of the present disclosure includes multiple sheets that have moisture adsorption and desorption properties and that are stacked on top of each other. At least some of the sheets each have an irregular shape. The sheets each contain a hygroscopic agent having properties of a re-moistening-type glue that exhibits adherence when adsorbing moisture and that solidifies when being dried. The sheets are bonded to each other by the hygroscopic agent.

Advantageous Effects of Invention

Since the hygroscopic agent contained in each of the sheets has properties of a re-moistening-type glue according to an embodiment of the present disclosure, the hygroscopic agent exhibits adherence to keep the sheets bonded to each other when adsorbing moisture, and then contracts while keeping the sheets bonded to each other when desorbing moisture. Thus, gaps are not easily formed in the bonded portions between the sheets. In such a manner, it is possible to reduce the probability that the gaps will be formed in the bonded portions between the sheets, and thus also possible to achieve a stable hygroscopic performance.

DESCRIPTION OF EMBODIMENTS

Figure 1:
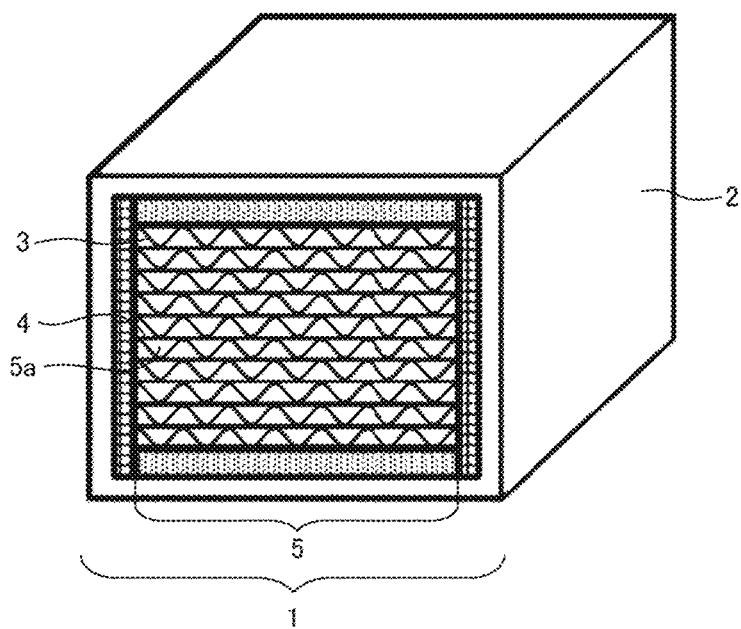
FIG. 1 is a perspective view of a dehumidifying element according to Embodiment 1.

A preferred embodiment of a dehumidifying element will be described with reference to the drawings. In each of figures in the drawings, components that are the same as a previous figure or previous figures will be denoted by the same reference signs.

Embodiment 1

FIG. 1 is a perspective view of a dehumidifying element according to Embodiment 1.

A dehumidifying element 1 includes a casing 2 having a frame shape and a layered body 5 in which first sheets 3 and second sheets 4 are alternately stacked. In the casing 2, the layered body 5 is provided. The first sheets 3 and the second sheets 4 have moisture adsorption and desorption properties. The casing 2 having a frame shape may have a polygonal, circular, or oval shape, or may have an arbitrary shape that varies depending on what device or apparatus the dehumidifying element 1 is provided in. The material of the casing 2 can be appropriately selected from various materials, such as plastic, metal, or wood, according to the temperature and humidity and the flow rate of air to be treated. Preferably, in order to fix the casing 2 and the layered body 5 to each other, a binder should be provided between the casing 2 and the layered body 5.

The first sheet 3 and the second sheet 4 each contain a hygroscopic agent 6 (see FIG. 2, which will be referred to below). Specifically, the first sheets 3 and the second sheets 4 are coated or impregnated with the hygroscopic agent 6. As the hygroscopic agent 6, for example, a high polymer compound containing polyacrylate can be applied.

The sheet base material of each of the first sheet 3 and the second sheet 4 is pulp paper, but may be selected from other materials. For example, the sheet base material may be, for example, a non-woven fabric base material made of polypropylene, polyethylene, polystyrene, polyester, or rayon. In addition, the sheet base material may be, for example, a resin fiber non-woven fabric or metallic fiber non-woven fabric made of metal having a high thermal conductivity, such as aluminum or copper.

The first sheet 3 and the second sheet 4 each containing the hygroscopic agent 6 are formed of, for example, a sheet non-woven fabric including a resin fiber mixed with the hygroscopic agent 6, or paper incorporating the hygroscopic agent 6. The following are examples of the method of causing the first sheet 3 and the second sheet 4 to contain the hygroscopic agent 6: in the case where the hygroscopic agent 6 is in a dispersion state or a solution state, a sheet base material is coated with the hygroscopic agent 6; and a sheet base material, which is, for example, paper or non-woven fabric, is impregnated with the hygroscopic agent 6. When being in the form of fiber, the hygroscopic agent 6 itself is used as a fiber that forms paper or non-woven fabric and is mixed with another fiber, whereby the other fiber contains the hygroscopic agent 6.

In order to improve the hygroscopic performance of the first sheets 3 and the second sheets 4 and bond layers which will be described later to each other, preferably, the first sheets 3 or the second sheets 4, or the first sheets 3 and the second sheets 4, should entirely contain the hygroscopic agent 6. In the case where the entire sheets contain the hygroscopic agent 6, when the layered body 5 is formed, the content of hygroscopic agent 6 per unit volume will increase, and the hygroscopic properties of the layered body 5 will be improved. Furthermore, as described below, the hygroscopic agent 6 adsorbs moisture in a high-humidity environment and exhibits adherence. Thus, in the case where the entire sheets contain the hygroscopic agent 6, the contact area between the sheets increases, and the entire contact portions can be bonded to each other. As a result, the layered body 5 becomes a more strongly bonded state.

Figure 2:
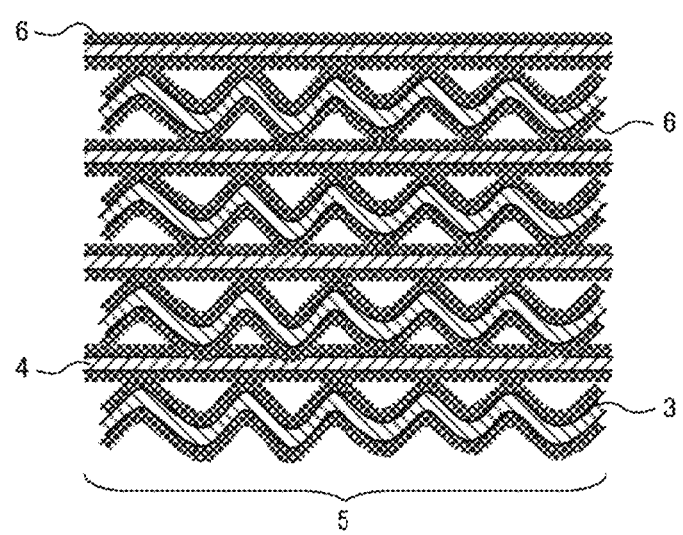
FIG. 2 is an enlarged schematic view of a layered body in the dehumidifying element according to Embodiment 1.
Figure 3:
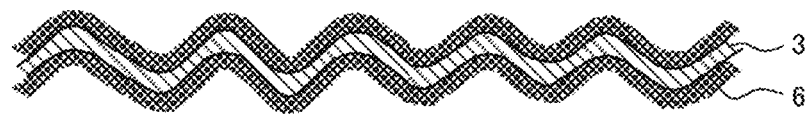
FIG. 3 is an enlarged schematic view of a first sheet of the dehumidifying element according to Embodiment 1.
Figure 4:
FIG. 4 is an enlarged schematic view of a second sheet of the dehumidifying element according to Embodiment 1.

FIG. 2 is an enlarged schematic view of the layered body in the dehumidifying element according to Embodiment 1. FIG. 3 is an enlarged schematic view of a first sheet of the dehumidifying element according to Embodiment 1. FIG. 4 is an enlarged schematic view of a second sheet of the dehumidifying element according to Embodiment 1.

In the dehumidifying element 1, the first sheets 3 and/or the second sheets 4 have an irregular shape. FIG. 2 illustrates by way example the first sheets 3 have an irregular shape and the second sheets 4 have a planar shape. Since the first sheets 3 and the second sheets 4 are alternately stacked on top of each other, voids are formed between the sheets and serve as air passages 5a through which air passes. The layered body 5 is provided in the casing 2 such that a surface of the layered body 5 from which the air passages 5a between the sheets are viewed is located at an opening surface of the casing 2.

As the hygroscopic performance of the first sheets 3 and the second sheets 4, at a relative humidity of 60% RH and at 20 degrees C., preferably, the first sheets 3 and the second sheets 4 should adsorb 10 g or more of moisture per square meter, and more preferably should adsorb 20 g or more of moisture per square meter. The hygroscopic agent 6 is partially water-soluble, and for example, satisfactorily adsorbs moisture in air at a relative humidity of 60% RH or more and at 20 degrees C. When the hygroscopic agent 6 adsorbs much moisture, this induces adherence and the hygroscopic agent thus exhibits adherence at the sheet surfaces. At a relative humidity of less than 60% RH, the hygroscopic agent 6 desorbs moisture and solidifies. When the hygroscopic agent 6 desorbs moisture, the adherence of the sheet surfaces is reduced to a low level. As described above, the hygroscopic agent 6 contains a re-moistening-type glue that exhibits adherence when adsorbing moisture and that solidifies and exhibits low adherence when desorbing moisture. The above values of the temperature, humidity, and other parameters are described as appropriate values, and these descriptions are not limiting.

In the case where the dehumidifying element 1 is applied to air conditioners, it is preferable that the humidity of an indoor space be adjusted to 40% to 60% RH. It is therefore easy to adjust the humidity of the indoor space by using, in the dehumidifying element 1, a hygroscopic agent 6 having a property of adsorbing much moisture at a humidity of 60% RH or higher.

The hygroscopic agent 6 is partially water-soluble as described above. It will be described what advantage is obtained by the partially water-soluble hygroscopic agent 6 with reference to FIGS. 5 and 6.

Figure 5:
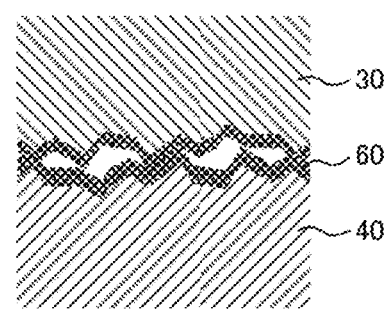
FIG. 5 is a view for explanation of an advantage of a hygroscopic agent of a comparative example.
Figure 6:
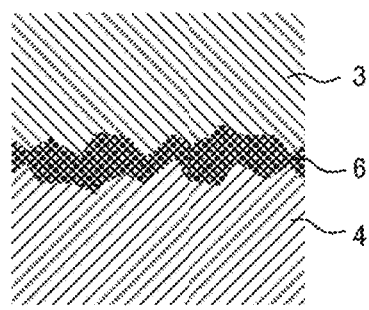
FIG. 6 is a view for describing the effect of a hygroscopic agent in the dehumidifying element according to Embodiment 1.

FIG. 5 is a view for explanation of an advantage obtained by a hygroscopic agent of a comparative example. FIG. 6 is a view for explanation of an advantage obtained by a hygroscopic agent in the dehumidifying element according to Embodiment 1.

A hygroscopic agent 60 that is hard and is not water-soluble has a poor anchoring effect on each of surfaces of a sheet 30 and a sheet 40 as illustrated in FIG. 5. By contrast, as illustrated in FIG. 6, the hygroscopic agent 6 according to Embodiment 1 is shaped to fit to the irregularities of the surface of each of the first sheet 3 and the second sheet 4 when the hygroscopic agent 6 adsorbs moisture and partially dissolves in it, and has thus a great anchoring effect on the surfaces. As a result, the hygroscopic agent 6 obtains a great adhesive effect when being dried.

Specifically, the partially water-soluble hygroscopic agent 6 has, for example, the following structure. The hygroscopic agent 6 is a cross-linked polyacrylate and includes a mixture of a polymer having a degree of crosslinking that corresponds to 0.2 mol % or less of a crosslinking agent to the monomer and a polymer having a degree of crosslinking that corresponds to higher than 0.2 mol % of the crosslinking agent to the monomer. The degree of crosslinking is the percentage of a polymer that remains after solvent immersion relative to the initial polymer.

Hydration related to water solubility occurs mainly near hydrophilic groups. The lower the percentage of crosslinked parts in the total polymers, the higher the percentage of hydrated parts in the total polymers, and the higher the water solubility. The lower the percentage of cross-linked parts, the less the polymer network structure, and the smaller the molecular weight. For example, a polymer having a molecular weight of 10,000,000 or less is easily dissolved in water when the polymer surface is hydrated. Thus, when the number of cross-linked parts is small, the molecular weight decreases and the water solubility may be improved.

As the amount of crosslinking agent increases, and the percentage of cross-linked parts increases, the water solubility decreases, but the moisture retention is improved. Since polymers having high moisture retention also have high hygroscopicity, the hygroscopic agent 6 is also made to contain a polymer having a high crosslinking agent content. When a salt is prepared from a divalent and higher valent metal, such as an alkaline-earth metal, intermolecular cross-linking occurs to cause gelation. The gelation may deteriorate the hygroscopicity and the water solubility, which are important for the dehumidifying element 1. The polyacrylate for use in the hygroscopic agent 6 is a polymer produced by polymerizing a monomer component containing an acrylate. It is preferable that the acrylate be an alkali metallic salt, such as lithium, sodium, potassium, rubidium, or cesium, or an ammonium salt. The salt for use in the hygroscopic agent 6 may be a mono-, di-, or tri-alkyl or hydroxyalkyl ammonium salt, a polyvalent metal salt, or a combination of these salts. With regard to neutralization of carboxyl groups, an acrylic acid may be neutralized into an acrylate before polymerization, or a polyacrylic acid during or after polymerization may be neutralized into a polyacrylate. Alternatively, these methods may be used in combination.

With regard to neutralization, an unneutralized carboxyl group, or a polyacrylic acid, may be neutralized with a base, or a neutralized carboxyl group, or a polyacrylate, may be neutralized with an acid. The following are examples of the acid or base for use in such neutralization: hydroxides of alkali metals or ammonia; various bases, such as carbonates or bicarbonates; and various acids, such as hydrochloric acid or sulfuric acid. In addition, as a method other than neutralization, an acid and a salt of carboxyl group may be converted using an ion exchange resin. By applying such a method, the polyacrylate is converted into a salt of an alkali metal, such as lithium, sodium, potassium, rubidium, or cesium, or an ammonium salt.

The hygroscopic agent 6 contains a partially cross-linked water-soluble acrylate as described above. The following are examples of the crosslinking component in such a partially cross-linked water-soluble acrylate: monomers having reactive groups, such as ethylene glycol dimethacrylate, trimethylolpropane trimethacrylate, ethylene glycol diacrylate, trimethylolpropane triacrylate, glyceryl trimethacrylate, glyceryl triacrylate, divinylbenzene, N-methylolacrylamide, glycidyl methacrylate, methacrylic acid, acrylic acid, linoleic acid, hydroxyethyl methacrylate, and hydroxyethyl acrylate.

The following are examples of the component to be copolymerized with these crosslinking components: methyl methacrylate; methyl acrylate; ethyl methacrylate; ethyl acrylate; butyl methacrylate; butyl acrylate; 2-ethylhexyl acrylate; 2-ethylhexyl methacrylate; styrene; N-isopropylacrylamide; N,N-dimethylacrylamide; N,N-dimethylaminomethylacrylamide; N,N-dimethylaminopropylacrylamide; vinyl methyl ether; vinyl ethyl ether; vinyl isopropyl ether, vinylpyrrolidone; vinyl acetate; maleic anhydride; sodium acrylate; ammonium acrylate; sodium stearate; ammonium stearate; and stearic acid amide.

As the polymerization catalyst in this case, a persulfate, such as ammonium persulfate, potassium persulfate or sodium persulfate can be generally used, and in addition, for example, benzoyl peroxide or azobisisobutyronitrile can be used.

In the dehumidifying element 1 having the above structure, when moist air enters the casing 2 and passes through the air passages 5a formed between the first sheets 3 and the second sheets 4, moisture in the air is adsorbed by the hygroscopic agent 6 contained in each of the first sheets 3 and the second sheets 4. As a result, the air is dehumidified, and the dehumidified air flows out of the casing 2. When dry air enters the casing 2 and passes through the air passages 5a formed between the first sheets 3 and the second sheets 4, moisture adsorbed by the hygroscopic agent 6 contained in each of the first sheets 3 and the second sheets 4 is given to the air passing through the air passages 5a. As a result, the air is humidified, and the humidified air flows out of the casing 2.

The dehumidifying element 1 expands and contracts as the hygroscopic agent 6 adsorbs and desorbs moisture. If the bonded portions between the sheets are not resistant to a stress that acts because of expansion and contraction of the dehumidifying element 1, the sheets may be broken, or gaps may be formed in the bonded portions between the sheets. In Embodiment 1, however, the hygroscopic agent 6 contains a re-moistening-type glue and thus exhibits adherence at a humidity (60% RH or higher in this case) at which much moisture is adsorbed. Thus, the bonded state of the sheets is weakened while the sheets are kept in contact with each other, and the sheets can slightly move relative to each other at the bonded portions. It is therefore possible to reduce the stress that acts because of expansion and contraction of the dehumidifying element 1 and reduce the probability with which the sheets may be broken and gaps are formed between the sheets.

Figure 7:
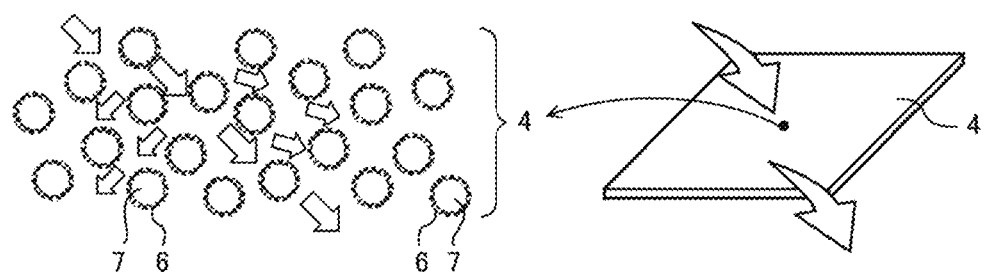
FIG. 7 is a schematic view illustrating the flow of air in a second sheet of the dehumidifying element according to Embodiment 1.

It is preferable that the first sheets 3 and the second sheets 4 have air permeability. In other words, it is preferable that the first sheets 3 and the second sheets 4 have fine voids in the sheets, and air diffuse through the voids and pass through the sheets themselves. This point will be described with reference to FIG. 7 by referring to the second sheet 4, which is illustrated in FIG. 7. However, the same is true of the first sheet 3.

FIG. 7 is a schematic view illustrating the flow of air in the second sheet of the dehumidifying element according to Embodiment 1. In FIG. 7, arrows indicate the flow of air.

In the case where the second sheet 4 itself have voids, air diffuses through the voids in the second sheet 4 and comes into contact with the hygroscopic agent 6 on the surface of a fiber 7 in the second sheet 4, whereby moisture in the air is adsorbed by the hygroscopic agent 6, as illustrated in FIG. 7. That is, since the air diffuses through the voids in the second sheet 4, the contact surface between the air and the hygroscopic agent 6 is larger than in the case where air cannot pass through the second sheet 4. Thus, the hygroscopic performance of the second sheet 4 is improved, and the hygroscopic properties are thus satisfactory. It should be noted that the above description refers to advantages obtained at the time at which moisture is adsorbed; however, the same advantages as described above are obtained at the time of drying, and the drying performance is improved. Since the sheets themselves have the air permeability, it is possible to increase a moisture adsorption rate and a drying rate of the dehumidifying element 1 as a whole. In order to efficiently support the hygroscopic agent 6 on the surface of the fiber 7, preferably, the fiber 7 should have higher wettability. Also, preferably, a hydrophilic fiber should be used as the fiber 7, or the fiber 7 should be hydrophilized.

As described above, it is preferable that the sheets have air permeability, and at least one of the first sheet 3 and the second sheet 4 have the lowest possible air resistance and the highest possible air flow rate. The permeation rate of air into the sheets is evaluated as the air permeance rate or air resistance defined in, for example, JIS P-8117:2009 and TAPPI T460 cm-02. Specifically, it is preferable that at least one of the first sheet 3 or the second sheet 4 have an air resistance of 5000 sec/100 cc or less as a value measured by a high pressure densometer.

As described above, the dehumidifying element 1 of Embodiment 1 includes a plurality of sheets that have moisture adsorption and desorption properties and that are stacked on top of each other, and at least some of the sheets each have an irregular shape. The sheets each contain a hygroscopic agent 6 having properties of a re-moistening-type glue that exhibits adherence when adsorbing moisture and that solidifies when being died. The sheets are bonded to each other by the hygroscopic agent 6.

Since the hygroscopic agent 6 contained in each of the sheets has properties of a re-moistening-type glue, the hygroscopic agent 6 exhibits adherence to keep the sheets bonded to each other when adsorbing moisture, and then contracts while keeping the sheets bonded to each other when desorbing moisture. Therefore, gaps are not easily formed in the bonded portions between the sheets. Since it is possible to reduce the probability that gaps will be formed in the bonded portions between the sheets, and thus reduce an uneven flow of air through the dehumidifying element 1 and can obtain a stable hygroscopic performance. The hygroscopic agent 6 exhibits adherence when adsorbing moisture, and the sheets can slightly move relative to each other in the bonded portions. It is therefore possible to weaken a stress that acts because of expansion and contraction of the dehumidifying element 1. As a result, it is possible to reduce the probability that the sheets will be broken and gaps will be formed between the sheets, and thus provide a dehumidifying element 1 having high durability.

In the dehumidifying element 1 of Embodiment 1, sheets having an irregular shape and sheets having a planar shape are alternately stacked on top of each other.

As described above, the layered body 5 having a stack of multiple sheets has a structure in which sheets having an irregular shape and sheets having a planar shape are alternately stacked.

The hygroscopic agent 6 contains a water-soluble polyacrylate.

Since the hygroscopic agent 6 contains a water-soluble polyacrylate as described above, the hygroscopic agent 6 fits between the sheet base materials when adsorbing moisture and improves the anchoring effect, whereby the sheets can be strongly bonded to each other. The water-soluble polyacrylate exhibits high moisture adsorption and thus improves the hygroscopic properties of the dehumidifying element 1.

The base materials of the sheets are each a non-woven fabric of pulp, resin fiber, or metal fiber, and have air permeability.

Since each of the base material has air permeability as described above, air diffuses through the base material, and the contact area between the air and the hygroscopic agent 6 contained in the base material thus increases, whereby the moisture adsorption rate and the drying rate during drying can be increased.

<Method of Manufacturing Dehumidifying Element>

Next, a method of manufacturing the dehumidifying element 1 will be described.

Figure 8:
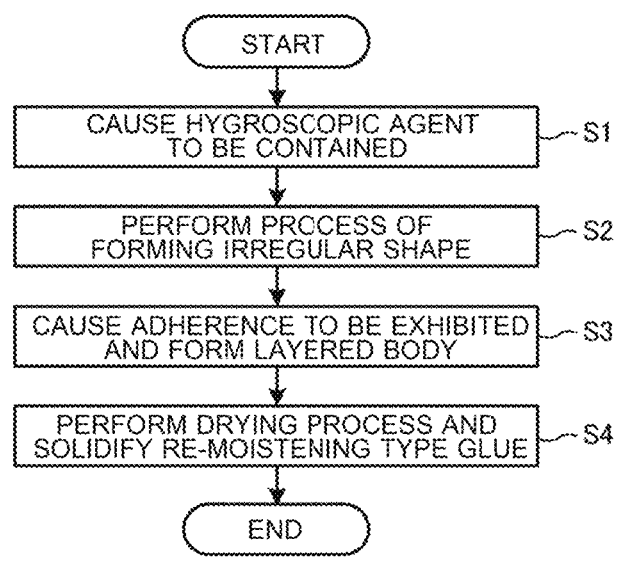
FIG. 8 is a flowchart of a method of manufacturing the dehumidifying element according to Embodiment 1.

FIG. 8 is a flowchart of a method of manufacturing the dehumidifying element according to Embodiment 1.

The dehumidifying element 1 is manufactured through steps indicated in FIG. 8. First, a plurality of sheets are each caused to contain a hygroscopic agent 6 containing a re-moistening-type glue (step S1). Then, some of the sheets are processed to have an irregular shape (step S2). The order in which step S1 and step S2 are carried out may be reversed. In other words, the sheets may be each caused to contain the hygroscopic agent 6 before or after some sheets are processed to have an irregular shape. Which of the orders in which the above steps are carried out is selected can be determined in consideration of the processability of sheet-like materials having moisture adsorption and desorption properties, the processability for attaching a moisture adsorbing and desorbing agent, and other factors. In the following description, sheets processed to have an irregular shape in step S2 are referred to as first sheets 3, and other sheets are referred to as second sheets 4.

Subsequently, the re-moistening-type glue is caused to exhibit adherence, and the first sheets 3 and the second sheets 4 are stacked on top of each other to form a layered body 5 (step S3). As the method of forming the layered body 5, the following two methods are provided: a method in which the first sheets 3 processed to have an irregular shape and the second sheets 4 are stacked in turn one by one (this method will be hereinafter referred to as a stacking method 1); and a method in which the first sheets 3 and the second sheets 4 are stacked after being subjected to bonding processing (this method will be hereinafter referred to as a stacking method 2).

(Stacking Method 1)

In the method in which the first sheets 3 processed to have an irregular shape and the second sheets 4 are stacked in turn one by one, steam is sprayed on a first sheet 3, or water is applied to a surface of the first sheet 3 with a brush or other tool. In such a manner, when moisture is given to the first sheet 3, the surface of the first sheet 3 exhibits adherence, and a second sheet 4 is stacked on the first sheet 3. At this time, when steam is sprayed on the second sheet 4 or when water is applied to a surface of the second sheet 4 with a brush or other tool, the surface of the second sheet 4 can also exhibit adherence, and it is therefore possible to achieve stronger bonding. Thus, it is preferable that steam be also sprayed on the second sheet 4 or water be also applied to the surface of the second sheet 4 with a brush or other tool.

Subsequently, steam is sprayed on or water is applied to, with a brush or other tool, a surface of the second sheet 4 that is opposite to a surface bonded to the first sheet 3, and a first sheet 3 is then stacked on the second sheet 4. This step is repeatedly carried to form the layered body 5. Since these sheets exhibit adherence at a relative humidity of 60% RH or more as described above, the step of spraying steam or the step of applying water to the surface with a brush or other tool can be omitted by maintaining a high humidity in the environment at the stacking time.

(Stacking Method 2)

In the method in which the first sheets 3 and the second sheets 4 are stacked on top of each other after being subjected to the bonding processing, an adhesive is applied to distal ends of protrusions of a first sheet 3 having an irregular shape and the surrounding areas of the distal ends, and the first sheet 3 and a second sheet 4 are bonded to each other. Preferably, the adhesive should have high adhesiveness. The following are examples of the adhesive: a silicone caulking agent; epoxy resin; vinyl acetate resin; an acrylic adhesive; polyvinylpyrrolidone; poval; and starch paste. Next, multiple bonded bodies each obtained by bonding a first sheet 3 and a second sheet 4 to each other are stacked on top of each other. In the case of stacking bonded bodies, steam is sprayed on or water is applied to, with a brush or other tool, a surface of a sheet of a bonded body, and another bonded body is stacked on and bonded to the former bonded body. Alternatively, multiple bonded bodies are stacked on top of each other in a high-humidity environment. As a result, the layered body 5 is formed.

After the step of forming the layered body 5 as described above, the layered body 5 is dried to solidify the re-moistening-type glue of the hygroscopic agent 6 on the sheet surfaces (step S4) and thus to reduce the adherence of the sheet surfaces. The sheets are thus bonded and fixed to each other. The layered body 5 in which the sheets are fixed is placed in the casing 2.

The dehumidifying element 1 is formed through the steps described above. In the case where a binder is applied between the casing 2 and the layered body 5, the layered body 5 may be placed in the casing 2 before the drying step, and be dried together with the binder.

A stack of the first sheet 3 and the second sheet 4 has, for example, a single-face corrugated board shape. In a method of forming a single-face corrugated board shape, the first sheet 3 is corrugated by inserting a material paper, using a corrugating machine, or a rack and a pinion, between the first sheet 3 and the corrugating machine or the rack and pinion. The second sheet 4 having a planar shape is stacked on the first sheet 3 while maintaining the planar shape, thereby combining a planar shape and a corrugated shape, and forming a single-face corrugated cardboard shape. In such a manner, in the dehumidifying element 1 of Embodiment 1, it suffices that at least one of the first sheet 3 and the second sheet 4 is processed to have an irregular shape, and the shape obtained by the processing of forming an irregular shape is not limited to the corrugated shape. As this processing, for example, knurling with an embossing roller or other roller may be applied.

In the above example, only one of the first sheet 3 and the second sheet 4 is processed to have an irregular shape. However, both the sheets 3 and 4 may be processed to have an irregular shape. In the case where the sheets 3 and 4 are both processed to have an irregular shape, the sheets are stacked such that recesses and protrusions of one sheet do not overlap with those of another sheet. In an example of the sheets both processed to have an irregular shape, it is conceivable that the first sheet 3 and the second sheet 4 are corrugated or knurled, and when the first and second sheets 3 and 4 are stacked, one of the first and second sheets 3 and 4 is inclined such that the recesses and protrusions of the above one sheet do not overlap with those of the other sheet. It should be noted that in the case of stacking sheets both processed to have an irregularly shape, in general, it is hard to define contact portions between the sheets and also hard to apply an adhesive at important positions to fix the sheets. By contrast, in the dehumidifying element 1 of Embodiment 1, the hygroscopic agent 6 containing a re-moistening-type glue is supported at the entire sheets. Thus, by moistening the hygroscopic agent 6 and stacking and drying the sheets, the contact portions between the sheets are bonded and fixed to each other. Thus, it is not necessary to apply an adhesive, and the workability is improved.

Embodiment 2

Embodiment 2 relates to a dehumidifying device including the dehumidifying element 1 of Embodiment 1.

Figure 9:
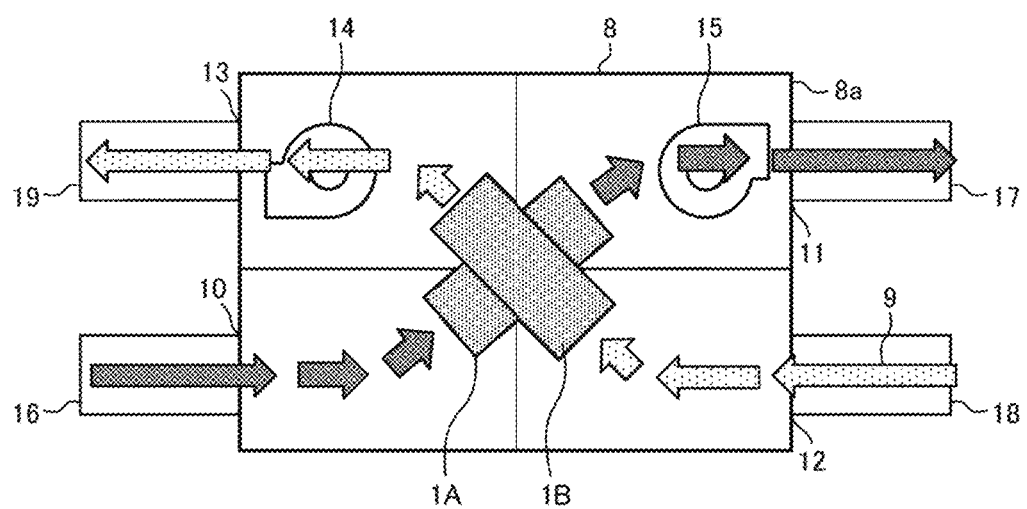
FIG. 9 is a schematic view of the structure of a dehumidifying device according to Embodiment 2.

FIG. 9 is a schematic view of a configuration of a dehumidifying device according to Embodiment 2.

A dehumidifying device 8 including a casing 8a in which a first inlet 10, a first outlet 11, a second inlet 12, and a second outlet 13 are formed. The first inlet 10 is connected with an outside air duct 16. The first outlet 11 is connected with a supply air duct 17. The second inlet 12 is connected with a return air duct 18. The second outlet 13 is connected with an exhaust air duct 19.

In the casing 8a, a supply air passage and an exhaust air passage are provided independent of each other. The supply air passage is an air passage through which the first inlet 10 communicates with the first outlet 11. The exhaust air passage is an air passage through which the second inlet 12 communicates with the second outlet 13. In the supply air passage, a supply air fan 15 and a first dehumidifying element 1A are provided. In the exhaust air passage, an exhaust air fan 14 and a second dehumidifying element 1B are provided. The first dehumidifying element 1A and the second dehumidifying element 1B are each the dehumidifying element 1 of Embodiment 1.

In the dehumidifying device 8 having the above configuration, when the supply air fan 15 is driven, a first fluid flows from an outdoor space into the outside air duct 16 and then flows into the supply air passage through the first inlet 10. The first fluid that has flowed into the supply air passage passes through the first dehumidifying element 1A, then flows out from the first outlet 11 and is supplied into the indoor space through the supply air duct 17. In the above case, in the supply air passage, when the first fluid passes through the first dehumidifying element 1A, moisture contained in the first fluid is adsorbed by the first dehumidifying element 1A, whereby the first fluid is dehumidified and the first dehumidifying element 1A is humidified. The dehumidified first fluid is supplied into the indoor space.

When the exhaust air fan 14 is driven, a second fluid flows from the indoor space into the return air duct 18 and then flows into the exhaust air passage through the second inlet 12. The second fluid that has flowed into the exhaust air passage passes through the second dehumidifying element 1B, then flows out from the second outlet 13 and is discharged to the outdoor space through the exhaust air duct 19. In the above case, in the exhaust air passage, when the second fluid passes through the second dehumidifying element 1B, moisture contained in the second dehumidifying element 1B is given to the second fluid, whereby the second fluid is humidified and the second dehumidifying element 1B is dried.

In the casing 8a, an air-passage switching member such as a damper (not illustrated) that performs switching between the air passages is provided. To be more specific, the switching between the air passages is performed such that the first fluid that flows through the supply air passage passes through the second dehumidifying element 1B and the second fluid that flows through the exhaust air passage passes through the first dehumidifying element 1A.

Therefore, when the supply air fan 15 is driven, the first fluid flows from the outdoor space into the outside air duct 16, and then flows into the supply air passage through the first inlet 10. The first fluid that has flowed into the supply air passage passes through the second dehumidifying element 1B, then flows out from the first outlet 11, and is supplied into the indoor space through the supply air duct 17. In the above case, in the supply air passage, when the first fluid passes through the second dehumidifying element 1B, moisture contained in the first fluid is adsorbed by the second dehumidifying element 1B, whereby the first fluid is dehumidified and the second dehumidifying element 1B is humidified. The dehumidified first fluid is supplied into the indoor space.

When the exhaust air fan 14 is driven, the second fluid flows from the indoor space into the return air duct 18, and then flows into the exhaust air passage through the second inlet 12. The second fluid that has flowed into the exhaust air passage passes through the first dehumidifying element 1A, then flows out from the second outlet 13, and is discharged to the outdoor space through the exhaust air duct 19. In the above case, in the exhaust air passage, when the second fluid passes through the first dehumidifying element 1A, moisture contained in the first dehumidifying element 1A is given to the second fluid, whereby the second fluid is humidified and the first dehumidifying element 1A is dried.

As described above, when the switching between the air passages is performed, humidification and drying processes are reversed such that before the switching, the first dehumidifying element 1A is humidified and the second dehumidifying element 1B is dried, and after the switching, the first dehumidifying element 1A is dried and the second dehumidifying element 1B is humidified.

The switching between the air passages is performed at regular intervals. As a result, humidification and drying of each of the dehumidifying elements are alternately repeated, thereby enabling a dehumidification operation to be continuously performed.

The dehumidifying device 8 of Embodiment 2 includes the dehumidifying element 1 of Embodiment 1, and can thus achieve a stable hygroscopic performance.

REFERENCE SIGNS LIST

1: dehumidifying element, 1A: first dehumidifying element, 1B: second dehumidifying element, 2: casing, 3: first sheet, 4: second sheet, 5: layered body, 5a: air passage, 6: hygroscopic agent, 7: fiber, 8: dehumidifying device, 8a: casing, 10: first inlet, 11: first outlet, 12: second inlet, 13: second outlet, 14: exhaust air fan, 15: supply air fan, 16: outside air duct, 17: supply air duct, 18: return air duct, 19: exhaust air duct, 30: sheet, 40: sheet, 60: hygroscopic agent

The invention claimed is:

1. A dehumidifying element using a layered body in which a plurality of sheets each containing a hygroscopic agent and having moisture adsorption and desorption properties are stacked on top of each other, and at least some of the sheets each have an irregular shape, the dehumidifying element comprising:
   a casing having a frame shape and holding the layered body; and
   a binder fixing the layered body in the casing,
   wherein
   the binder is different from the hygroscopic agent,
   the hygroscopic agent has properties of a re-moistening-type glue that exhibits adherence when adsorbing moisture and that solidifies when being dried, and the hygroscopic agent bonds the plurality of sheets to each other, and
   the hygroscopic agent is a crosslinked polyacrylate and includes a mixture of a polymer having a degree of crosslinking that corresponds to 0.2 mol % or less of a crosslinking agent to a monomer and a polymer having a degree of crosslinking that corresponds to higher than 0.2 mol % of the crosslinking agent to the monomer.

2. The dehumidifying element of claim 1, wherein in the plurality of sheets, the sheets each having the irregular shape and sheets each having a planar shape are alternately stacked on top of one another.

3. The dehumidifying element of claim 1, wherein the hygroscopic agent contains a water-soluble polyacrylate.

4. The dehumidifying element of claim 1. wherein base materials of the plurality of sheets are each a non-woven fabric of pulp, resin fiber, or metal fiber, and have air permeability.

5. A dehumidifying device comprising the dehumidiying element of claim 1.

6. A method of manufacturing a dehumidifying element, comprising:
   causing each of a plurality of sheets to contain a hygroscopic agent containing a re-moistening-type glue;
   processing some of the plurality of sheets to cause each of the some sheets to have an irregular shape;
   forming a layered body by bonding the plurality of sheets to each other, the bonding of the plurality of sheets being achieved by moistening each of the plurality of sheets to cause the re-moistening-type glue in the sheet to exhibit adherence; and
   drying the layered body to solidify the re-moistening-type glue,
   preparing a casing having a frame shape,
   fixing the dried layered body in the casing using a binder that is different from the hygroscopic agent, and
   preparing, as the hygroscopic agent, an admixture that is a crosslinked polyacrylate and includes a mixture of a polymer having a degree of crosslinking that corresponds to 0.2 mol % or less of a crosslinking agent to a monomer and a polymer having a degree of crosslinking that corresponds to higher than 0.2 mol % of the crosslinking agent to the monomer.

7. The method of manufacturing a dehumidifying element of claim 6, wherein in the forming the layered body, in the plurality of sheets, the sheets each caused to have the irregular shape and sheets each having a planar shape are stacked on top of each other.

8. The method of manufacturing a dehumidifying element of claim 6, wherein a hygroscopic agent containing a water-soluble polyacrylate is used as the hygroscopic agent.

9. The method of manufacturing a dehumidifying element of claim 6, wherein base materials of the plurality of sheets are each a non-woven fabric of pulp, resin fiber, or metal fiber, and have air permeability.

* * * * *